(No Model.)

W. R. FOWLER.
MILK COOLER.

No. 334,767. Patented Jan. 26, 1886.

Witnesses

Inventor
William R. Fowler,
By his Attorney Chas. H. Fowler

United States Patent Office.

WILLIAM R. FOWLER, OF LAFAYETTE, INDIANA.

MILK-COOLER.

SPECIFICATION forming part of Letters Patent No. 334,767, dated January 26, 1886.

Application filed September 26, 1885. Serial No. 178,277. (No model.)

*To all whom it may concern:*

Be it known that I, WILLIAM R. FOWLER, a citizen of the United States, residing at Lafayette, in the county of Tippecanoe and State of Indiana, have invented certain new and useful Improvements in Milk-Coolers; and I do hereby declare that the following is a full, clear, and exact description of the same, reference being had to the annexed drawings, making a part of this specification, and to the letters and figures of reference marked thereon.

Figure 1:
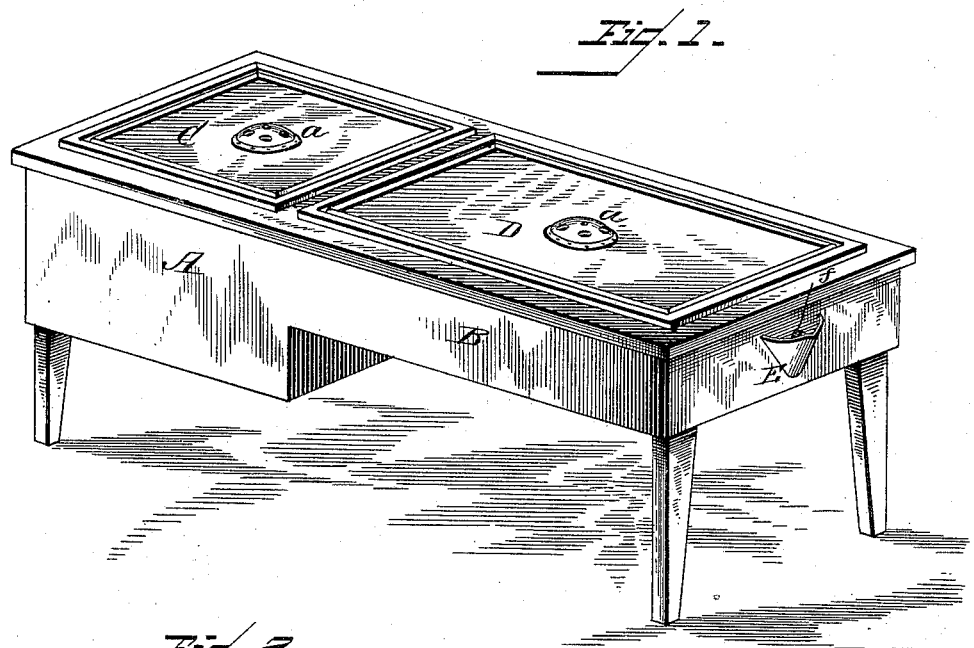
Figure 2:
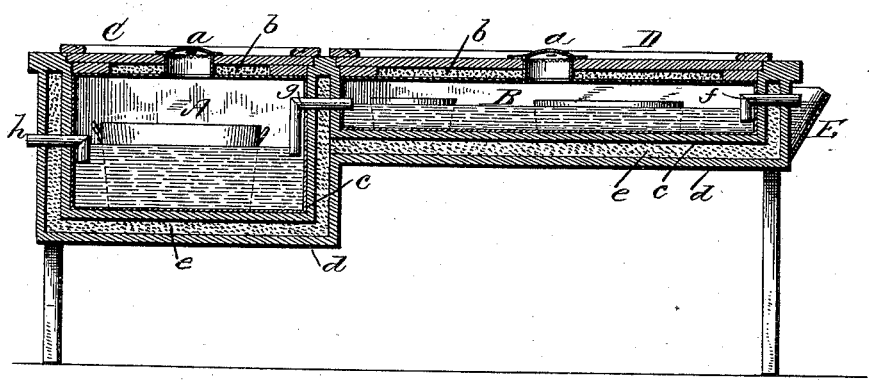

Figure 1 of the drawings is a perspective view of my invention; Fig. 2, a longitudinal section thereof.

The present invention has relation to certain new and useful improvements in milk-coolers; and it consists in the details of construction, substantially as shown in the drawings, and hereinafter described and claimed.

In the accompanying drawings, A B represent two tanks suitably lined with sheet metal, and provided, respectively, with covers C D, each of which has a ventilator, *a*, for carrying off all impurities that may arise from the milk, said ventilators being of any desirable construction. The under side of the covers C D are also lined with sheet metal, a space being formed for containing a filling, *b*, of charcoal as a non-conductor of heat. The tanks A B have double walls *c d*, between which is a filling, *e*, also of charcoal, and, like the filling in the covers, is designed as a non-conductor of heat, to thus exclude it from the tanks containing the water. The tank B is supplied with water through a pipe, *f*, at the outer end of the tank, and the water passes therefrom to the tank A through a pipe, *g*, which forms a communication between the two, the water escaping through a discharge-pipe, *h*. These pipes are each provided with a downwardly-extending elbow which enters the water, thus forming traps to exclude the air from the tanks and preventing it passing from one tank to the other, while the impurities arising from the milk are carried off through the ventilators. To the end of the tank B is connected a bucket, E, which surrounds the projecting end of the pipe *f*, and extends some distance above it. This bucket receives the water from the pump or spring, and by its use the necessity of making an attachment to the pipe *f* when filling tanks is entirely avoided.

Were such connection made with the pipe *f* from a pump throwing a large stream of water, it would force the water into the tanks faster than the pipe *h* could discharge it, and consequently the tanks would overflow. The bucket E prevents this, as by its use a large or small stream can be used, and if a large one, a certain amount of water only will pass through pipe *f*, and the surplus water run out of the bucket.

The tanks A B, as will be noticed, are of different depths, the tank A being deep enough to hold cans or stone jars for containing large quantities of milk for making butter. The tank B is shallow, to set therein shallow pans or other shallow vessels, the two independent tanks enabling the milk in one tank to be removed without disturbing the milk in the other tank. A large quantity of milk requires more water to cool it, and for this reason I make the tank A of increased depth.

The large or deeper one of the tanks enables very large quantities of milk to be cooled when butter is to be made for the market, the shallow tank being intended more particularly for family use.

Having now fully described my invention, what I claim as new, and desire to secure by Letters Patent, is—

A milk-cooler consisting of one deep and one shallow tank communicating with each other through a pipe formed with an elbow to act as a trap, and similar pipes passing through the ends of the tanks, and a bucket connected to the end of the shallow tank, as shown, the elbow of each pipe entering the water, and the tanks and covers thereto having a filling of a non-conducting material, substantially as and for the purpose set forth.

In testimony that I claim the above I have hereunto subscribed my name in the presence of two witnesses.

WILLIAM R. FOWLER.

Witnesses:
JOSEPH C. DAVIDSON,
STEPHEN A. WILSTACH.